(12) United States Patent
Deane et al.

(10) Patent No.: US 7,424,039 B2
(45) Date of Patent: Sep. 9, 2008

(54) METHOD AND APPARATUS FOR PROCESSING MULTIPLE COMMON FREQUENCY SIGNALS THROUGH A SINGLE CABLE

(75) Inventors: Peter Deane, Fitzroy Harbour (CA);
Abdelgader Legnain, Nepean (CA);
Marthinus Da Silveira, Nepean (CA);
Neil McGowan, Stittsville (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 938 days.

(21) Appl. No.: 10/642,686

(22) Filed: Aug. 19, 2003

(65) Prior Publication Data

US 2004/0190480 A1 Sep. 30, 2004

Related U.S. Application Data

(60) Provisional application No. 60/458,012, filed on Mar. 28, 2003.

(51) Int. Cl.
*H04J 3/04* (2006.01)
(52) U.S. Cl. .................................. 370/535; 370/209
(58) Field of Classification Search ................ 370/209, 370/342, 441, 480–487, 535, 536, 542
See application file for complete search history.

(56) References Cited

U.S. PATENT DOCUMENTS 4,768,187 A * 8/1988 Marshall .................... 370/343
4,839,894 A * 6/1989 Rudish et al. ............... 370/497
5,748,669 A 5/1998 Yada
5,774,193 A 6/1998 Vaughan
5,784,683 A 7/1998 Sistanizadeh et al.
5,818,875 A * 10/1998 Suzuki et al. ............... 375/261
6,011,513 A * 1/2000 Wilson et al. ............... 342/372
6,178,158 B1 * 1/2001 Suzuki et al. ............... 370/203
6,192,070 B1 2/2001 Poon et al.
6,522,642 B1 2/2003 Scott
6,760,342 B1 * 7/2004 Skones et al. ............... 370/437
2002/0196497 A1 * 12/2002 LoCascio et al. ............ 370/535

* cited by examiner

*Primary Examiner*—Ricky Ngo
*Assistant Examiner*—Pao Sinkantarakorn
(74) *Attorney, Agent, or Firm*—Jeffrey M. Measures; Borden Ladner Gervais LLP

(57) ABSTRACT

A method and apparatus for processing multiple signals at a common frequency fed through a single radio frequency (RF) cable with or without one or more amplifiers and utilized for either forward or reverse link transmissions. The invention enables a single power amplifier to amplify multiple RF signals that occupy a common frequency channel and after amplification splitting these signals into amplified copies of the originals. The amplified signals may be sent to different antenna ports to illuminate different base station sectors if required. The signal splitting function is performed at the antenna masthead such that this method reduces the number of feeder cables running up the antenna tower by a factor of N, where N is the number of common frequency signals (e.g., the number of sectors) amplified by the single power amplifier. This invention enables a single power amplifier to simultaneously provide all the radio frequency signals necessary to feed a general N input phased array antenna system and form multiple antenna beams uniquely for several individual users simultaneously.

39 Claims, 6 Drawing Sheets

METHOD AND APPARATUS FOR PROCESSING MULTIPLE COMMON FREQUENCY SIGNALS THROUGH A SINGLE CABLE

RELATED APPLICATIONS

The present application claims priority from U.S. Provisional Application 60/458,012 filed Mar. 28, 2003 and is related to U.S. patent application Ser. No. 10/642,649 filed on Aug. 19, 2003 in the name of Deane et al. and titled "METHOD AND APPARATUS FOR PROCESSING MULTIPLE COMMON FREQUENCY SIGNALS THROUGH A SINGLE CABLE USING CIRCULATORS"

BACKGROUND OF THE INVENTION

1. Field of the Invention

The present invention relates to the field of radio frequency (RF) transmission and signal processing related thereto. More specifically, the present invention pertains to a method and apparatus for processing multiple signals at a common frequency fed through a single RF cable with or without one or more amplifiers and utilized for either forward or reverse link transmissions.

2. Description of the Prior Art

In the area of RF transmission, many problems exist with regard to cost and reliability of components. This is particularly true when considering typical antenna structures and RF circuitry elements related to such antenna structures. Most antenna structures are inherently inhospitable environments due to their exposure to wind, precipitation, and temperature extremes. Such environmental difficulties often cause premature failure of RF circuitry elements located on antennas, thus necessitating truck rolls and costly technician time. Further, some RF circuitry elements are considered more vulnerable to failure. Still further, placement of RF circuitry elements at or near the antenna masthead presents logistical, if not safety, concerns due to the difficulty of physical access. In instances where removal of the masthead for subsequent repair is the only manner of access, significant system downtime will occur. Accordingly, designers of RF systems are always looking for ways to reduce placement of high power (and relatively low reliability) RF circuitry elements at the antenna and masthead.

In addition to physical considerations, designers of RF systems must also contend with maintaining systems losses at a minimum.

Antenna structures within many RF transmission systems that are multi-sectored such as, but not limited to, code division multiple access (CDMA) systems typically include technologies that require a high power amplifier (HPA) for each sector. For purposes of this application, it should be understood that where the term "antenna structure" is used it should be read to include any antenna itself or may also include a tower, building, or similar physical means that supports the given antenna.

Due to the low reliability of the HPA elements, HPAs are normally placed at the base of the antenna structure. As each signal is run through a given HPA, this aspect necessitates multiple runs of RF cabling to antenna ports on the antenna masthead. Often, such multi-sectored systems will also include features such as beam-splitting and directional antenna arrays that further crowd the antenna tower itself with requisite RF cabling. Aside from weight considerations, wind load becomes an increasing concern with the increase of RF cabling. In instances of environmental occurrences such as ice build-up and/or high winds, an abundance of surface area in the form of RF cabling can result in catastrophic failure of the antenna structure.

What is needed therefore is a manner in which costly, high power (but low reliability) RF circuitry elements are eliminated in regards to the antenna-related portion (i.e., masthead) of an RF system such as, but not limited to, a CDMA system. Further, what is needed is a manner in which multiple runs of RF cabling are reduced.

SUMMARY OF THE INVENTION

The present invention provides a method and apparatus for processing multiple signals occupying a common frequency through a single RF cable. The inventive method and apparatus may include one or more HPAs located at the base of the antenna structure for forward link transmission. In the case of reverse link transmissions, the method and apparatus of the present invention would not require HPAs at the base of the antenna structure, but would rather require preamplifiers located at the masthead of the antenna structure. It should be understood that such preamplifiers would be relatively low power and therefore of a suitable reliability for placement at the masthead without compromising the value of the present invention.

In the instance where multiple HPAs are used at the base of the antenna structure with distinct signals (at a common frequency), the HPAs would be located prior to combining the signals and feeding them into a single RF cable. In the alternative instance where a single HPA is used, the single HPA would be located after combining the signals but prior to feeding the combined signals into a single RF cable. Either of these two instances are most suitable for forward link transmission and it should be readily understood that the specific location and placement of one or more HPAs may vary due to the given implementation of the present invention without straying from the intended scope of the instant method and apparatus. Moreover, the existence of even one HPA is not necessitated by the present invention. Rather, the method and apparatus of the present invention is suitable for reverse link transmission where no HPAs are used. In such instance, relatively reliable, low power preamplifiers would be located at the antenna masthead of the antenna structure.

The present invention is operable for forward link transmission by way of combining multiple signals (before or after amplification by one or more HPAs as mentioned above) at the base of an antenna structure, transmitting the combined signal through a single RF cable to the antenna masthead, and de-combining the combined signal prior to transmission of the multiple signals to a set of antenna ports for signal propagation therefrom.

The present invention is operable for reverse link transmission by way of combining multiple signals after pre-amplification using low power amplifiers at the masthead of an antenna structure, transmitting the combined signal through a single RF cable to the base of the antenna structure, and de-combining the combined signal prior to transmission of the multiple signals to a set of input ports (e.g., base-station receiver inputs) for signal transmission therefrom.

The inventive aspect of combining multiple signals within the same frequency and subsequently de-combining such aggregate signal reduces costly high power RF circuitry elements in regards to the antenna-related portion of an RF system such as, but not limited to, a CDMA system with a masthead HPA and RF cabling. Indeed, the present invention is system-independent (i.e., independent of modulation format) in that any RF system transmitting multiple signals at a common frequency over a single RF cable would benefit from the inventive method and apparatus disclosed herein.

The method and apparatus of the present invention is accomplished by way of a modulation/demodulation scheme using Walsh codes and modified Wilkinson combiner. The Walsh code modulation/demodulation scheme is discussed further hereinbelow. The basic concept within the present invention is the same for either the forward or reverse links. That is to say, forward and reverse link transmissions occurring within the scope of the present invention both include the advantageous aspects of modulating signals having a common frequency, combining such signals so as to pass the combined signal along a single RF cable, and de-combining and de-modulating the combined signal in order to reconstitute the original signals without significant losses, distortion, or cross-talk.

In the instance of forward link transmission, multiple (N) signals having a common frequency are each modulated by a short Walsh code phase sequence by way of a respective phase shifter at each of N inputs. Specifically, the multiple signals are phase shifted according to a short Walsh modulation sequence (of length 4 chips in the illustrated example). The phase-shifted signals are then combined to form an aggregate signal. The aggregate signal is then amplified by way of passing though a single HPA. Alternatively, as mentioned above, these signals may be amplified prior to being modulated by the Walsh code sequences and subsequently combined. This allows the amplified aggregate signal to pass through a single RF cable up the length of an antenna structure. At the antenna masthead, the amplified aggregate signal is split via a delay line together with a modified Wilkinson combiner and then demodulated via the Walsh demodulation scheme. Each related demodulated, phase-shifted signal then passes to a predetermined related antenna port for propagation therefrom.

In the instance of reverse link transmission, multiple (N) signals having a common frequency are received at respective antenna ports and then amplified by way of passing though a respective low power preamplifier located at the antenna masthead. Each amplified signal is then modulated by a short Walsh code phase sequence by way of a respective phase shifter. Specifically, the multiple signals are phase shifted according to a short Walsh modulation sequence (of length 4 chips in the illustrated example). The phase-shifted signals are then combined to form an aggregate signal. This allows the amplified aggregate signal to pass through a single RF cable down the length of an antenna structure. At the base of the antenna structure, the amplified aggregate signal is split via a delay line together with a modified Wilkinson combiner and then demodulated via the Walsh demodulation scheme. Each related demodulated, phase-shifted signal then passes to a set of input ports (e.g., base-station receiver inputs) for signal reception.

While the present invention may be utilized in a manner whereby the method and apparatus may be arranged in order to provide for either signal receiving or transmission as outlined above, for purposes of clarity the example discussed in more detail below will primarily focus on the forward link. It should be well understood that one of ordinary skill in the art of digital signal processing would recognize the reverse link variation to be well within the intended scope of the present invention. As well, one skilled in the art would recognize that a detailed implementation would require circuitry details that are only discussed in general terms below. Again, any such generalities are for the purposes of clarity of illustrating a preferred embodiment of the present invention.

DETAILED DESCRIPTION OF THE INVENTION

The invention will be described for the purposes of illustration only in connection with certain embodiments; however, it is to be understood that other objects and advantages of the present invention will be made apparent by the following description of the drawings according to the present invention. While a preferred embodiment is disclosed, this is not intended to be limiting. Rather, the general principles set forth herein are considered to be merely illustrative of the scope of the present invention and it is to be further understood that numerous changes may be made without straying from the scope of the present invention.

During operation of a CDMA system or any related RF system, one sector corresponding to a multi-sector antenna may reach peak traffic capacity and generally require full power. Conventionally, in a three sector cell for example when three cables are run up an antenna tower and three corresponding HPAs exist to send each signal up the corresponding cable, there is no way that power can be transferred between sectors should one sector require more than the other two. In the present invention, power is effectively shared among the three sectors because the signals are combined and full power is effectively always available for any sector. This is accomplished via the trunking aspect of one HPA and one cable.

Figure 1:
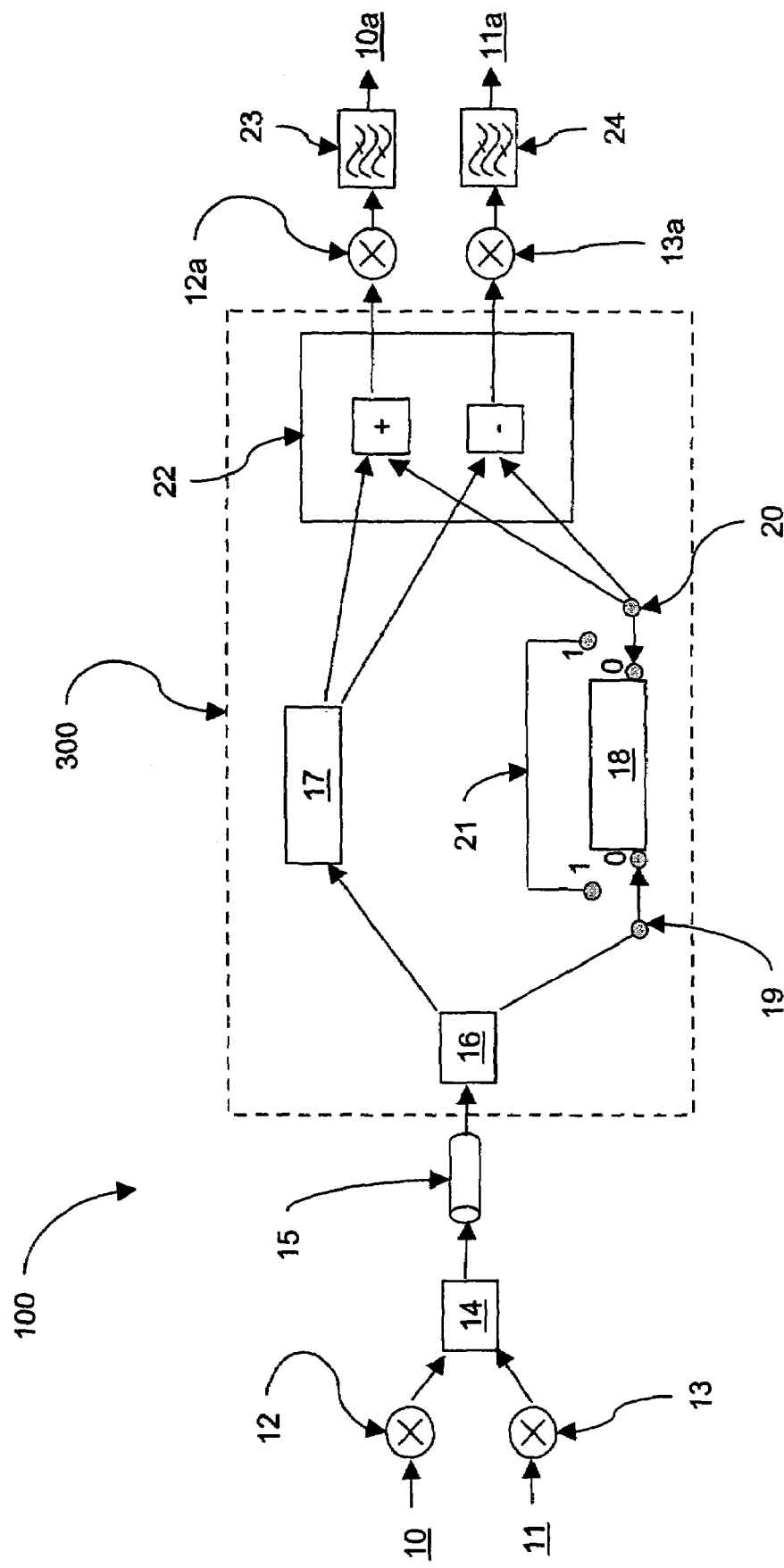
FIG. 1 is a block diagram illustrating two common carrier signals combined and recovered in accordance with the present invention.

With reference to FIG. 1 there is illustrated an example of a first embodiment 100 of the present invention using modulation/demodulation implemented via Walsh codes. While only two signal input channels 10, 11 for corresponding sectors are shown, it should be understood that any number of sectors and corresponding signals (i.e., N number of signals) are possible with the current invention. The two channels 10, 11 (e.g., CDMA forward link sectors or beams) are modulated via fast chip Walsh modulators 12, 13 as shown.

Generally speaking, Walsh modulation/demodulation involves the use of Walsh codes to distinguish different signals during transmission. It will be appreciated by those skilled in the art that several different spreading codes exist which can be used to separate data signals from one another in a CDMA communication system. These spreading codes include but are not limited to pseudo noise (PN) codes and Walsh codes. A Walsh code corresponds to a single row or column of the Hadamard matrix. For example, in a 64 channel CDMA spread spectrum system, particular mutually orthogonal Walsh codes can be selected from the set of 64 Walsh codes within a 64 by 64 Hadamard matrix. Also, a particular data signal can be separated from the other data signals by using a particular Walsh code to spread the particular data signal.

Further, it will be appreciated by those skilled in the art that spreading codes can be used to channel code data signals. The data signals are channel coded to improve performance of the communication system by enabling transmitted signals to better withstand the effects of various channel impairments, such as noise, fading, and jamming. Walsh codes can be used to channel code a data signal prior to modulation of the data signal for subsequent transmission. Other orthogonal or quasi-orthogonal methodology may also be used for modulation within the inventive method and apparatus for an equivalent implementation without straying from the intended scope of the present invention. In order to use Walsh codes in signal spreading or channel coding, the Walsh codes must be readily available for use. One technique for making the Walsh codes readily available is to generate the Walsh codes by placing the desired Walsh codes in a memory-based lookup table. Subsequently, as each Walsh code is needed, it must be retrieved from the lookup table.

In the present invention, the modulation used is a four chips long Walsh code—e.g., a 4×4 Walsh code matrix. With continued reference to FIG. 1, each of the two input channels 10, 11 is bi-phase shift key (BPSK) modulated by a unique (and different) Walsh code (within modulators 12, 13) from the four available. The modulation rate is synchronized to the normal CDMA chip rate but is at N times this rate (i.e., 4 Fc). The effect of this (fast) Walsh code modulation on the normal CDMA chips is to produce a Sin(x)/x spectrum with sidebands separated by N*Fc centered at the carrier frequency. Consider the input channel 10 is modulated with the fast Walsh code zero (0). The signal component for input channel 10 will enter the "in-phase" splitter 16 and be differentially delayed by ½ slow chip (i.e., two "fast" chips delay line 17).

Figure 1A:
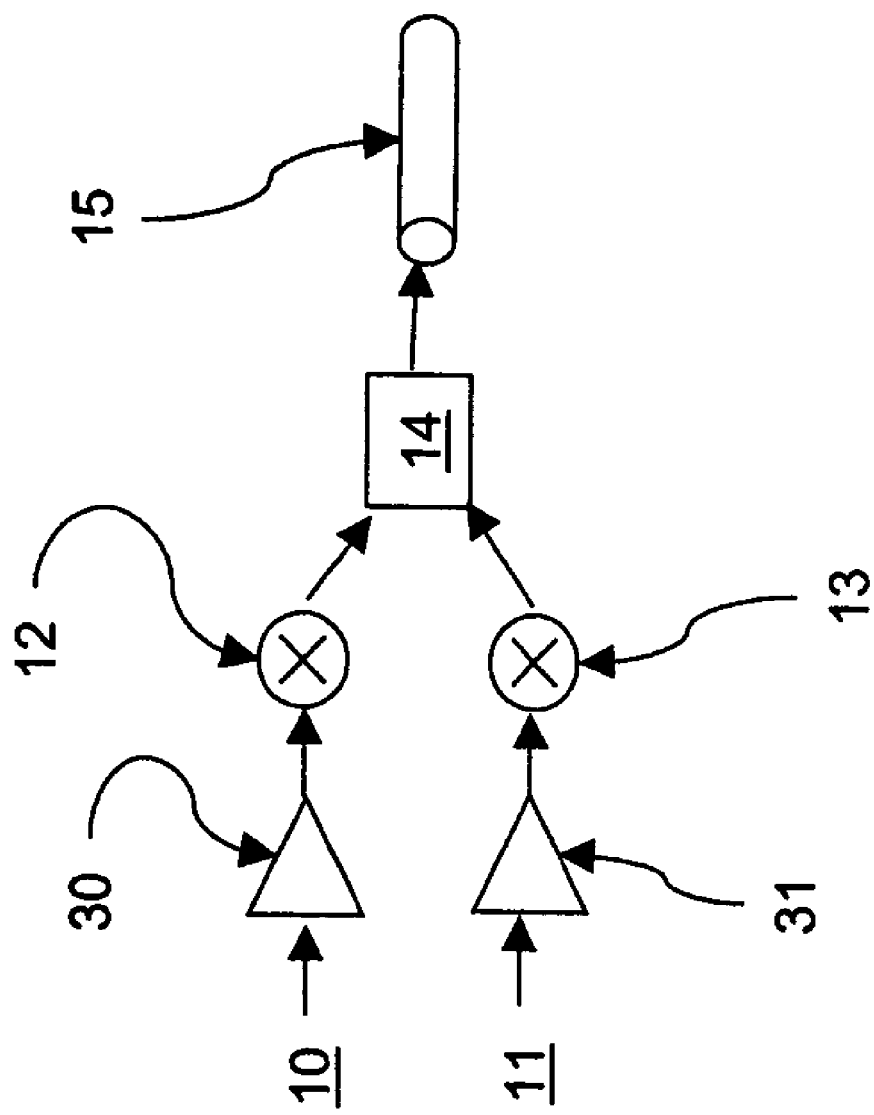
FIG. 1A is a block diagram illustrating a different input portion of the diagram shown in FIG. 1 including multiple amplifiers for a forward link configuration of the present invention.
Figure 1B:
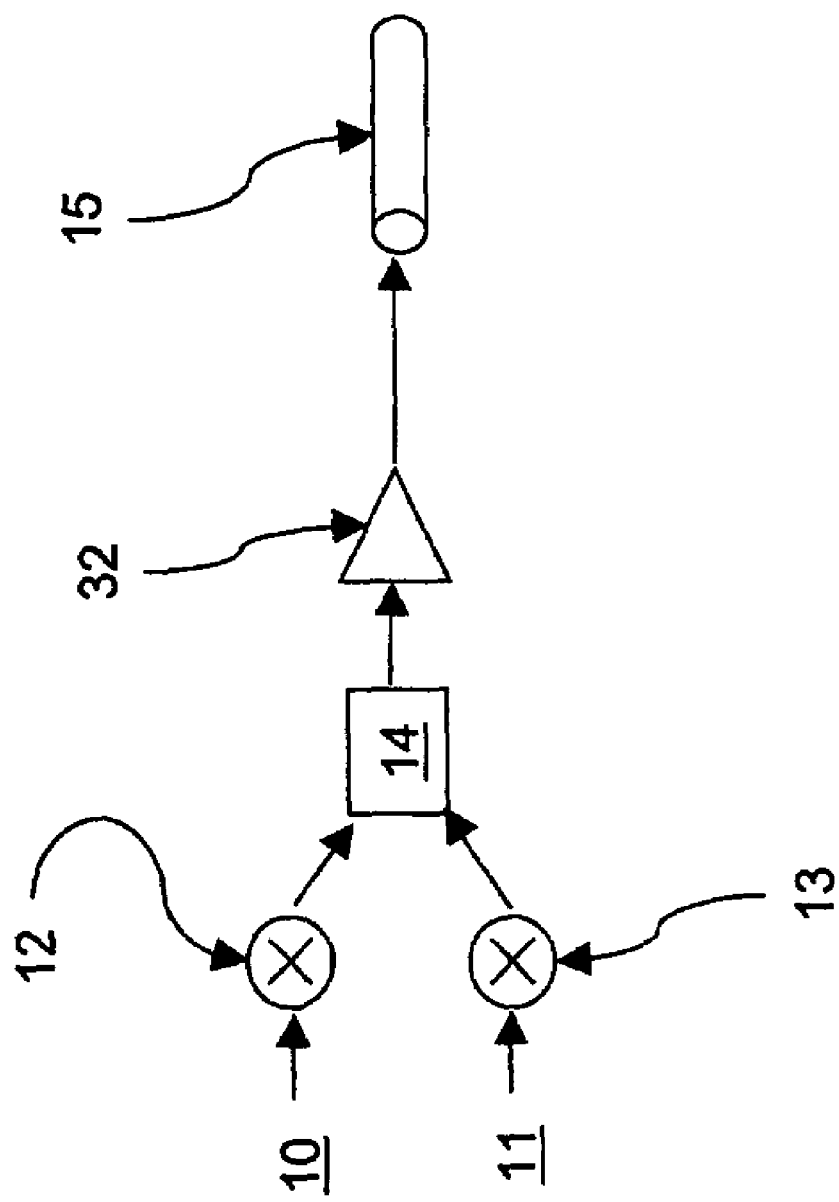
FIG. 1B is a block diagram illustrating another different input portion of the diagram shown in FIG. 1 including a single amplifier for a forward link configuration of the present invention.

With continued reference to FIG. 1, Walsh code modulated signals are then combined into one RF stream by a combiner 14. If forward link transmission occurs, then the input signals 10, 11 may each be amplified prior to modulation by way of a corresponding high power amplifier (HPA) 30, 31 as shown in FIG. 1A. Alternatively, a common HPA 32 placed after the combiner 14 as shown in FIG. 1B is also possible for the forward link implementation of the present invention. It is important to note that such combining allows a single RF cable 15 to be used between the one or more HPAs and the demodulation elements 12a, 13a located at the masthead (not illustrated). While a slightly larger cable is needed, windage and related structural upgrades to the antenna tower are significantly reduced by the use of only one cable 15. Initial experimental results indicate in regard to the present invention that the power losses in a single cable, depending upon the length of cable required can minimize or possibly outweigh the losses in increased demodulation.

Next, the two differential signals are applied to the hybrid that splits the aggregate signal into two different paths. The combination of the two "fast" chips delay line 17 and the four "fast" chips delay line 18 (together with the associated switching circuitry 19, 20) functions like a "comb filter" which forces the differential RF signals from Walsh codes 0 and 1 to appear at the "in-phase" port of the Modified Wilkinson combiner 22, while those from Walsh codes 2 & 3 appear at the "anti-phase" port of the same combiner 22. Consequently, the combination of a switched delay line filter (collectively elements 16, 17, 18, 19, 20, and 21) and modified Wilkinson combiner 22 acts as a demux 300 in the form of a high power RF Walsh code discriminator.

The modified Wilkinson combiner 22 is configured as a 4-port, relative-phase discriminator. This means that signals appearing at the two input ports (port 1 & port 2) that are "in phase" are combined at the sum output (port 3), whereas signals that appear at the input ports that are in "anti-phase" appear at the difference port (port 4). The primary modification to the standard Wilkinson combiner is that the balance resistor normally used to dissipate anti-phase signal energy is replaced with an RF transformer that provides a low loss path to the difference port (port 4). However, any (low loss) circuit that can effectively discriminate between two input signals that are "in phase" or in "anti-phase" could be used in place of the Wilkinson combiner 22 for purposes of the present invention.

Figure 1C:
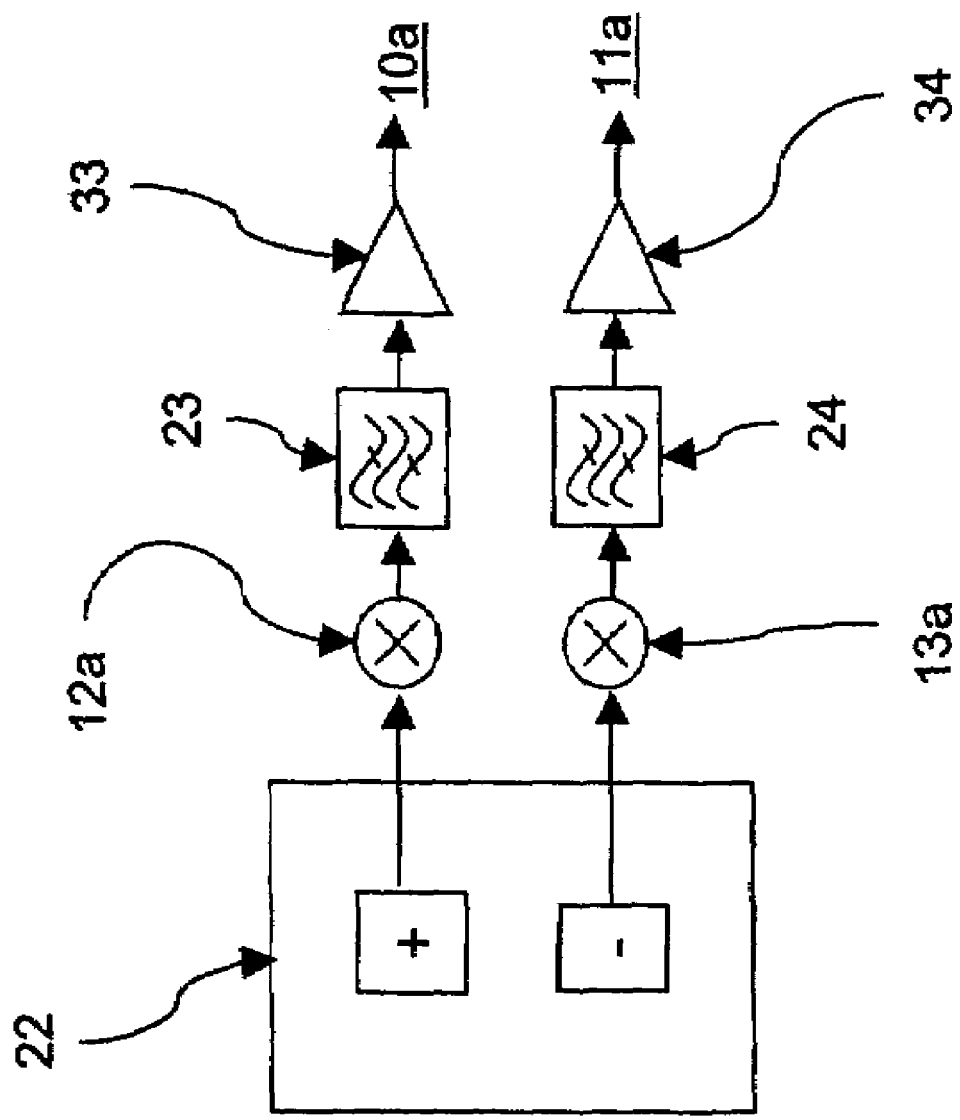
FIG. 1C is a block diagram illustrating a different output portion of the diagram shown in FIG. 1 including multiple amplifiers for a reverse link configuration of the present invention.

The final stage of the process occurs when the signals are re-constituted by the de-modulators 12a, 13a that are effectively identical in operation to the modulators 12, 13. Filters 23, 24 further assure reconstituted output signals 10a, 11a are substantially identical to input signals 10, 11 and free of any distortion. It should be readily understood that transmission may also be in the reverse link without straying from the intended scope of the present invention in addition to the forward link mentioned in regard to FIGS. 1A and 1B above. In such instance of reverse link transmission under the present invention, no HPAs would be used. Rather, low power preamplifiers 33, 34 as shown in FIG. 1C would be required.

In the illustrated embodiment of FIG. 1, the modulators 12, 13 and de-modulators 12a, 13a include lambda/2 lines switched in or out by PIN diode switches controlled by clock signals derived from the transceiver's N*Fc clocks. While PIN diodes are described herein, it should be readily understood by those skilled in the art that any suitable switching element may be used. TABLE 1 below indicates the signal processing occurring within FIG. 1.

TABLE 1

Signal 1 data
Signal 2 data

Slow Chip

| A | A |
|---|---|
| B | -B |

Fast Walsh Code 0
Fast Walsh Code 2

Fast Chip

| 1 | 1 | 1 | 1 | 1 | 1 | 1 | 1 |
|---|---|---|---|---|---|---|---|
| 1 | 1 | -1 | -1 | 1 | 1 | -1 | -1 |

TABLE 1-continued

| | | | | | | | | |
|---|---|---|---|---|---|---|---|---|
| Multiply signal 1 with Walsh 0 | A | A | A | A | A | A | A | A |
| Multiply signal 2 with Walsh 2 | B | B | -B | -B | -B | -B | B | B |

Sum the Walsh multiplied signals

| A+B | A+B | A-B | A-B | A-B | A-B | A+B | A+B |

This sequence is now transmitted over the single cable
At the other end of the cable, the signals are split in two to form sequence 1 and 2

Sequence (after splitting) forming sequence 1

| A+B | A+B | A-B | A-B | A-B | A-B | A+B | A+B |

Sequence 1 delayed by 0.5 slow chips

Delay whole sequence by 0.5 slow chips

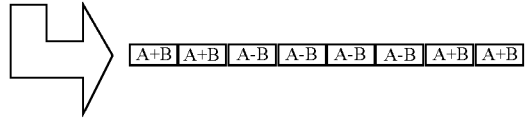

| A+B | A+B | A-B | A-B | A-B | A-B | A+B | A+B |

Delay first two fast chip samples by 1 slow chip
and pass last two samples through without delay Sequence (after splitting) forming sequence 2

| A+B | A+B | A-B | A-B | A-B | A-B | A+B | A+B |

First half of sequence 2 delayed by one slow chip
Second half of sequence 2 undelayed

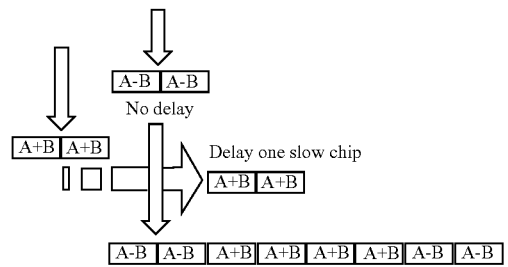

| A-B | A-B | A+B | A+B | A+B | A+B | A-B | A-B |

(Sequence 1 + Sequence 2)/2

| A | A | A | A | A | A | A | A |

Multiply with Fast Walsh Code 0

| A | A | A | A | A | A | A | A |

Original signal 1 recovered

| A | A |

(Sequence 1 − Sequence 2)/2

| B | B | -B | -B | -B | -B | B | B |

Multiply with Fast Walsh Code 2

| B | B | B | B | -B | -B | -B | -B |

Original signal 2 recovered

| B | -B |

Figure 2:
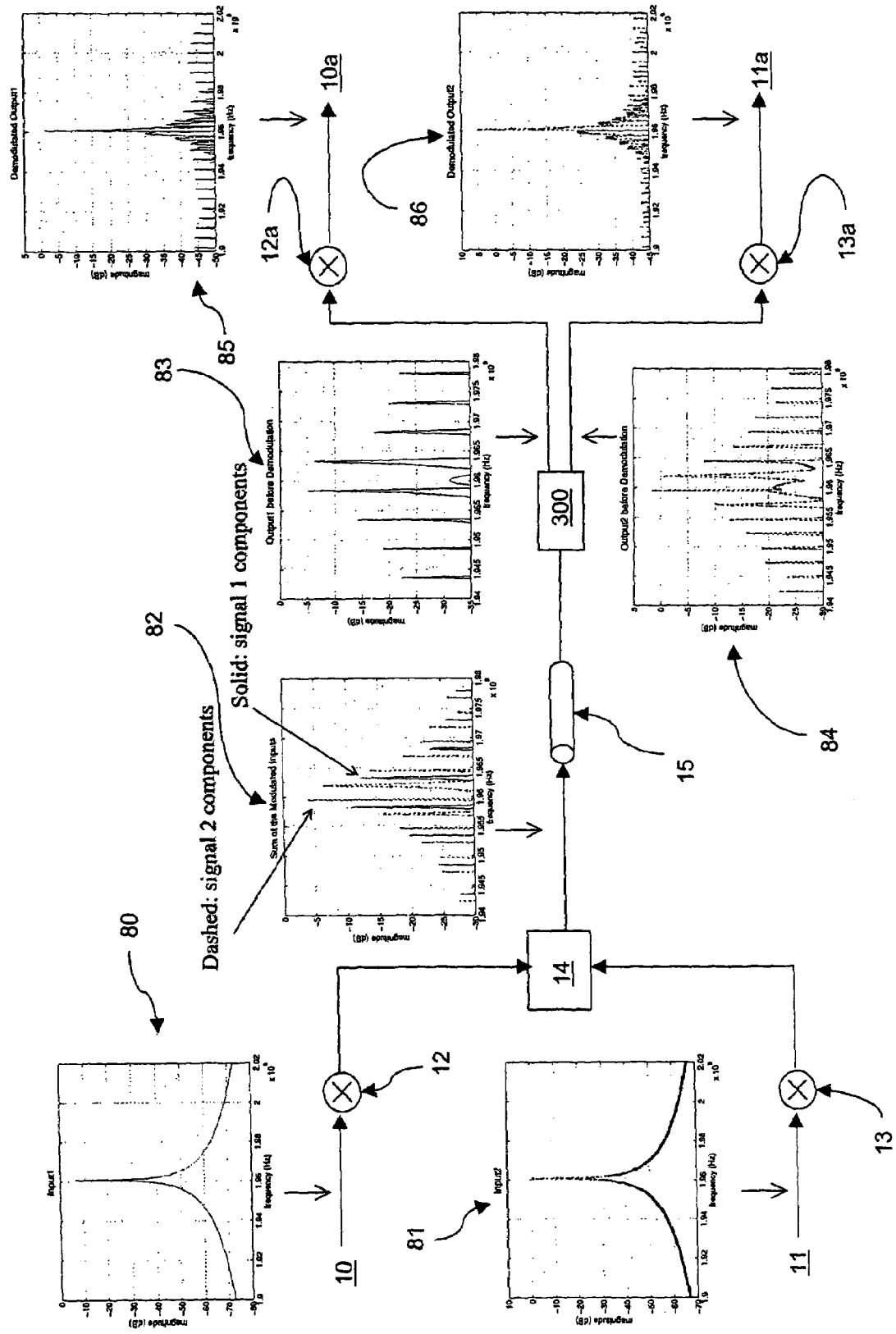
FIG. 2 is a flowchart overlaying a block diagram illustrating the signal processing occurring at the various stages of FIG. 1.

FIG. 2 shows graphically a series of signal simulations. Each graphical representation shown corresponds to a specific stage of the signal processing of FIG. 1. From FIG. 2, input signals 10, 11 are represented by corresponding graphs 80, 81. After modulation 12, 13 and combining 14, the aggregate signal is shown in graph 82 with signal 1 components and signal 2 components corresponding to input signal 10 and 11, respectively. The aggregate signal is transmitted through a length of RF cabling 15. Demultiplexing occurs at the other end of the RF cabling 15 and is represented by the demux 300 shown and results in graphs 83 and 84 corresponding to each modulated signal 1 and signal 2 components. Each demuxed, modulated signal is then demodulated by a corresponding demodulator 12a, 13a to form recovered signals 10a, 11a as shown in graphs 85 and 86.

The demux 300 shown in FIGS. 1 and 2 represents a splitter 16, delay line 17, 18, 19, 20, 21, and a modified Wilkinson combiner 22. Operationally, the demux 300 discriminates between signals (i.e., sectors) that have been pre-coded with different Walsh codes by way of a relatively narrow band filter constructed with a delay line 17, 18, 19, 20, 21, together with a modified Wilkinson combiner 22. Such filter performs its discrimination task because Walsh codes express their mutual orthogonality in the frequency domain. Specifically, for a four chip Walsh code set to combine two sectors, there are four frequencies separated by Fc/4 that can be combined to produce each and every one of the four Walsh code ship sets. For example, the first Walsh code (i.e., Walsh code zero) has a zero offset frequency from the input signal. That is to say, the original signal is unaltered after modulation with Walsh code zero. Consequently, the only spectrum of Walsh code-zero is only occupied at offset frequency zero. This spectrum is contrasted with that of Walsh code 2 which has its energy at offset frequencies of 1*Fc/4 and 3*Fc/4.

Ideally, a high power, low loss filter with small component count that discriminated between odd and even offset frequencies (i.e., zero and 2*Fc/4 or 1 and 3*Fc/4 in this instance) would discriminate between Walsh code zero and Walsh code 2. According to the present invention, a simple delay line filter (collectively 17, 18, 19, 20, 21 in FIG. 1) performs this odd/even frequency discrimination where F(t)/2+F(t+2 chips)/2 only passes the Walsh codes zero and 1 (from the set of four), whereas F(t)/2−F(t+2 chips)/only passes the Walsh codes 2 and 3 from the set. Accordingly, connecting the delayed and un-delayed chips to the two combiner inputs of the modified Wilkinson combiner causes the even offset frequencies (Walsh codes zero and 1) to appear at the normal (even mode) output and the odd offset frequencies (Walsh codes 2 and 3) to appear across the fourth (odd mode) Wilkinson port. The fourth Wilkinson port typically has a 100 ohm resistor, but is modified according to the present invention to include a 50 ohm resistor. It should be noted that it is also possible to use a 4 port, 90 degree hybrid for this purpose so long as low RF losses of less than 0.2 dB exist.

As mentioned above, the present invention may be used for any number of signals. Although only two signals have been thus described with regard to the present invention, FIG. 3 shows an example of the underlying inventive concepts applied to a three-sector arrangement.

Figure 3:
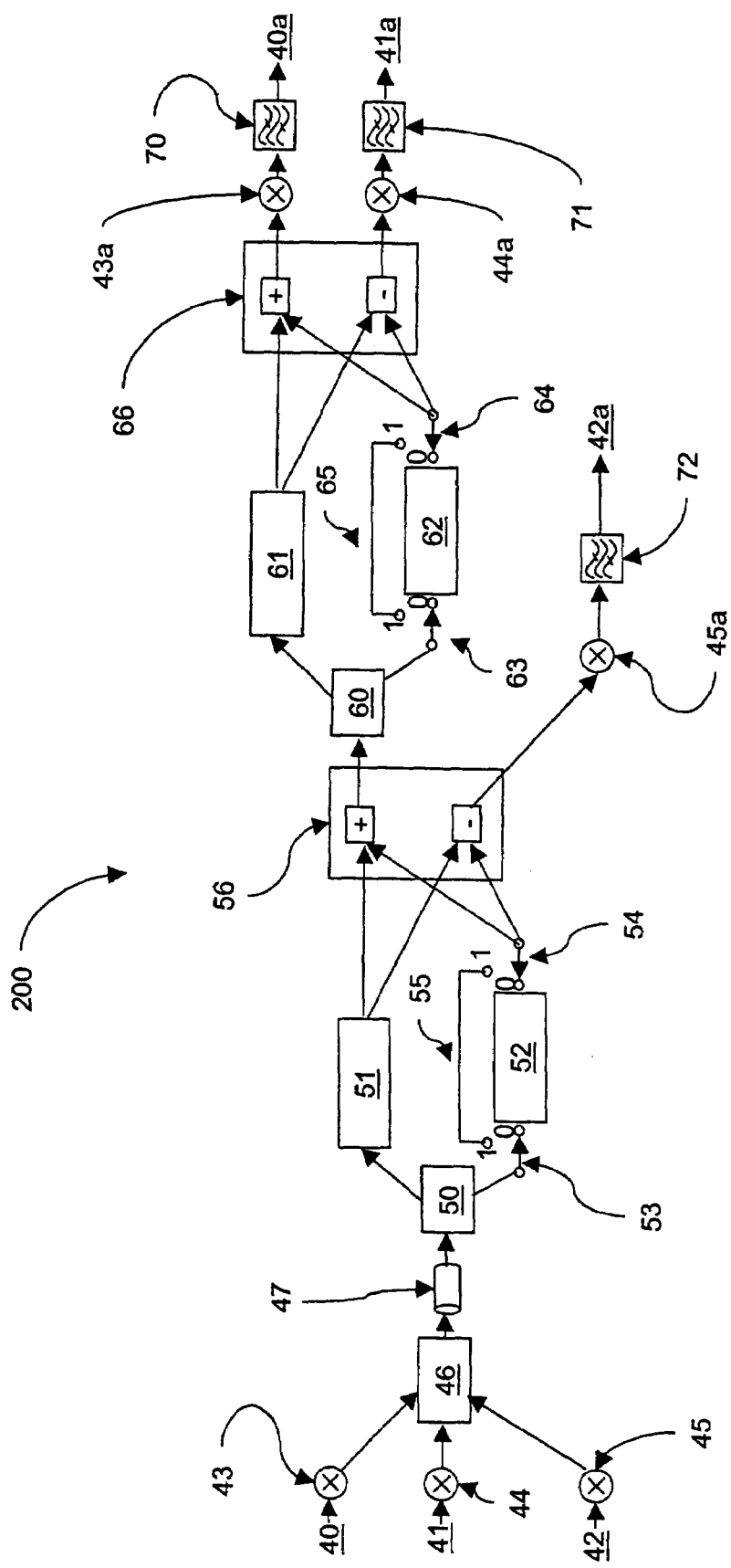
FIG. 3 is a block diagram illustrating three common carrier signals combined and recovered in accordance with the present invention.

FIG. 3 shows a block diagram processing three (3) input signals 40, 41, 42 in accordance with the present invention. Each input signal 40, 41, 42 is modulated via modulators 43, 44, 45 as described above with regard to FIG. 1. The modulated signals are then combined by combiner 46 and passed through a length of RF cabling 47. Though not shown, multiple HPAs or a single HPA may be provided in a manner as described above during forward link transmission. After transmission through the RF cabling 46, the aggregate signal stream passes through first splitter 50 and passes through a first and second demux (collectively 50-56 and 60-66, respectively) that are arranged in a cascaded manner. TABLE 2 below shows the signal processing up to the length of RF cabling 47.

TABLE 2

| | | |
|---|---|---|
| Signal 1 data | Time → | |
| Signal 2 data | | |
| Signal 3 data | Slow Chip | |
| | A | A |
| | B | -B |
| | C | -C |
| Fast Walsh Code 0 | Fast Chip ↔ | |
| Fast Walsh Code 1 | 1 1 1 1 1 1 1 1 | |
| Fast Walsh Code 2 | 1 -1 1 -1 1 -1 1 -1 | |
| | 1 1 -1 -1 1 1 -1 -1 | |
| Multiply signal 1 with Walsh 0 | A A A A A A A A | |
| Multiply signal 2 with Walsh 1 | B -B B -B -B B -B B | |
| Multiply signal 3 with Walsh 2 | C C -C -C -C -C C C | |
| Sum the Walsh multiplied signals | A+B+C  A+B+C  A+B-C  A-B-C  A-B-C  A+B-C  A-B+C  A+B+C | |

This sequence is now transmitted over the single cable

More specifically, the aggregate signal stream passes through a first delay line (collectively 51, 52, 53, 54, 55) and subsequently a first modified Wilkinson combiner 56 in a manner as described with respect to FIG. 1. However, in this three sector configuration, the difference port of the first combiner 56 passes a signal component corresponding to input signal 42 to demodulator 45a and filter 72 to output a reconstituted signal 42a that corresponds substantially identically to input signal 42. The sum port of the first combiner 56 passes the remaining signal component corresponding to input signals 40, 42 into the second demux (collectively 60-66). That remaining signal component is split by a second splitter 60 and processed by a second delay line (collectively 61, 62, 63, 64, 65) and subsequently a second modified Wilkinson combiner 66 again in a manner as described with respect to FIG. 1.

At this point, the difference port of the first combiner 56 passes a signal component corresponding to input signal 40 to demodulator 43a and filter 70 to output a reconstituted signal 40a that corresponds substantially identically to input signal 40. The sum port of the second combiner 66 passes the remaining signal component corresponding to input signal 41 to demodulator 44a and filter 71 to output a reconstituted signal 41a that corresponds substantially identically to input signal 41. TABLE 3 below indicates the signal processing occurring within FIG. 3 after the length of RF cabling 47.

TABLE 3

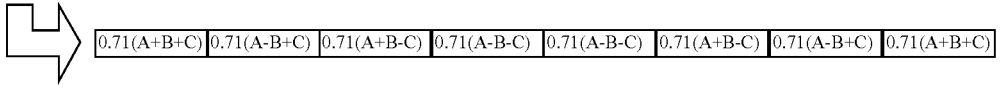
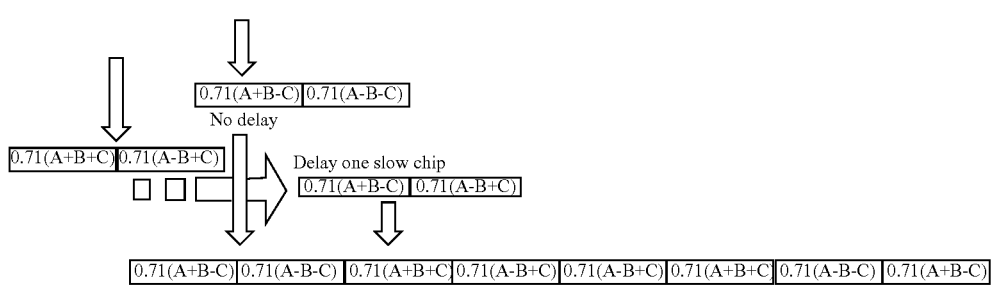

TABLE 3-continued

| | |
|---|---|
| Sequence 3 delayed by 0.25 slow chips | Delay whole sequence by 0.25 slow chips <br> 0.707(A+B) \| 0.707(A-B) \| 0.707(A+B) \| 0.707(A-B) \| 0.707(A-B) \| 0.707(A+B) \| 0.707(A-B) \| 0.707(A+B) |
| Switch 3 position <br> Switch 4 position | 0  0  0  1  1  1  0  1  1  1  0 <br> 0  0  0  1  1  1  0  1  1  1  0 |
| Sequence after splitting forming sequence 4 | 0.707(A+B) \| 0.707(A-B) \| 0.707(A+B) \| 0.707(A-B) \| 0.707(A-B) \| 0.707(A+B) \| 0.707(A-B) \| 0.707(A+B) <br> 0.707(A-B) \| 0.707(A+B) \| 0.707(A-B) <br> No Delay <br> 0.707(A+B) <br> 0.707(A+B) |
| Delay 1st fast chip by 1 slow chip Fast chips 2,3 and 4 is undelayed | 0.707(A-B) \| 0.707(A+B) \| 0.707(A-B) \| 0.707(A+B) \| 0.707(A+B) \| 0.707(A-B) \| 0.707(A+B) \| 0.707(A-B) |
| Hybrid In Phase Combining = (Seq 3 + Seq 4) * 0.707 | A \| A \| A \| A \| A \| A \| A \| A |
| Multiply with Fast Walsh Code 0 | A \| A \| A \| A \| A \| A \| A \| A |
| Original signal 1 recovered (after filtering) | A                A |
| Hybrid Out of Phase Combining = (Seq 3 + Seq 4) * 0.707 | B \| -B \| B \| -B \| -B \| B \| -B \| B |

It should be readily understood that reducing the conventional manner of using multiple HPAs and cables by way of the present invention reduces system costs in that the HPA is one of the costliest elements of the basestation. However, it should also be noted that multiple HPAs may still benefit by the demodulation configurations as outlined by the present invention.

Further, it is within the intended scope of the present invention that even if multiple HPAs are used, the total number of HPAs can be reduced as the N:1 relationship of input signals to aggregate signals may occur anywhere in the system. Accordingly, a CDMA communications system and the like will still benefit from the 1:N relationship of the demodulation at the antenna end of the tower. In such instances, it is recognized that multiple cables would still be needed up the tower to the antenna, but the existence of HPAs at the masthead would be eliminated by the inventive demodulation apparatus and method.

Overall, the present invention provides communications systems such as, but not limited to, CDMA cellular systems with significant capacity improvements. These improvements are a direct result of base station sector trunking efficiencies beyond those obtainable from individual per sector power amplifiers. This results from the fact that, in CDMA cellular systems, mobile traffic distribution is normally unequally distributed across sectors. Consequently, one sector usually reaches its maximum power (i.e., maximum traffic) capability before the others and additional users are then blocked from access to the sector. However, the present invention-allows RF power from the other under-utilized sectors to be re-routed to the heavily loaded sector. Accordingly, significantly greater offered traffic could be accommodated before blocking occurred which effectively increases the base station's maximum traffic capacity.

This invention enables all of the RF power from all of the sectors to be available at any sector to match any (arbitrary) sector traffic load combination. This process is automatic and consequently improves the base station's traffic capacity despite unbalanced sector loads. Further, reducing the number and size of antenna tower RF cables helps system operators control their capital expenditures by reducing the tower's reinforcing requirements. Also, in cases where the antenna tower is shared or leased by the system operators, the rental expenses often increase as cables are added. Importantly, in such situations system operators may be prevented from expanding the number of antenna tower cables (needed to support the traffic load increases). This of course, directly impacts future revenue improvements at those sites.

The problems noted above are exacerbated by the recent introduction of smart antenna systems that generally require significantly more RF cables than conventional systems especially when the HPAs are not mounted at the tower top. The present invention overcomes this by allowing base station RF interfaces to remain relatively simple (with only one or two transmitter and receiver ports per sector) and yet still be capable of interfacing and utilizing phased array systems having six, eight or more input and output ports.

It should be understood that the preferred embodiments mentioned here are merely illustrative of the present invention. Numerous variations in design and use of the present invention may be contemplated in view of the following claims without straying from the intended scope and field of the invention herein disclosed.

Having thus described the invention, what is claimed as new and secured by Letters Patent is:

1. An apparatus for processing N number of input signals having a common frequency and chip rate, said apparatus comprising:
    at least N number of modulators for modulating N of said N number of input signals into N number of modulated signals;
    a combiner for combining said modulated signals into an aggregate signal;
    a demux element for decombining said aggregate signal into N number of constituent modulated signals; and
    at least N number of demodulators for demodulating each of said N number of constituent modulated signals into N number of recovered signals each corresponding substantially identically to one of said N number of input signals;
    wherein said demux element includes N−1 splitters, a delay element associated with each splitter, each delay element having one or more switches for switching in a delay dependent on said chin rate, and a phase discriminator associated with each delay element.

2. An apparatus as claimed in claim 1 wherein said N−1 splitters, delay elements and phase discriminators are arranged in cascaded stages to sequentially split said aggregate signal into said N number of recovered signals.

3. An apparatus as claimed in claim 2 wherein each delay element comprises:
    a first transmission line for transmitting a first output from its associated splitter;
    a second transmission line and a delay line associated with said second transmission lines for transmitting a second output from its associated splitter; and
    one or more switches for switching a signal between said delay line and said second transmission line for controllably adding said delay between said first and second outputs.

4. An apparatus as claimed in claim 3 wherein said delay introduced by each delay element is also dependent on the stage of said delay element.

5. An apparatus as claimed in claim 4 wherein said delay introduced by the first delay element is equal to ½ of the chip rate.

6. An apparatus as claimed in claim 5 wherein the delay introduced by the each subsequent delay element is equal to ½ of the delay introduced by the immediately proceeding delay element.

7. An apparatus as claimed in claim 4 wherein said first transmission line introduces a fixed amount of delay equal to ½ of the delay introduced by an immediately proceeding delay element to said first output, with the first such delay element introducing a delay equal to ½ of the chip rate; and second transmission line introduces a minimal delay, and said delay line introduces the same amount of delay as said first transmission line, such that said delay is equal to the amount of delay introduced by said first transmission line when said switch is set in one position, and is equal to minimal delay when said switch is set in the other position.

8. An apparatus as claimed in claim 7 wherein said switch is set in one position for one of two differential delay states in each slow chip period and the other position for the other differential delay state as required by the timing required to time shift one of the two split signals paths in each demodulator element by said differential delay with respect to the other path such that the sum of the two time periods equals the slow chip period.

9. An apparatus as claimed in claim 5 wherein said apparatus is configured for a 3-sector base station with N=3 such that said demux element includes a first and second splitter, and wherein said first delay element is associated with said first splitter and wherein a second delay element associated with said second splitter introduces a delay equal to ¼ of the chip rate.

10. The apparatus as claimed in claim 9 wherein a length of cabling is placed between said combiner and said splitter.

11. The apparatus as claimed in claim 10 wherein said length of cabling spans at least a portion of an antenna structure.

12. The apparatus as claimed in claim 11, further including a plurality of amplifiers each located such that said input signals pass through a respective one of said plurality of amplifiers prior to passing through said at least N number of modulators.

13. The apparatus as claimed in claim 12 wherein said input signals are forward link transmissions and said plurality of amplifiers are high power amplifiers.

14. The apparatus as claimed in claim 12 wherein said input signals are reverse link transmissions and said plurality of amplifiers are low power preamplifiers.

15. The apparatus as claimed in claim 11 wherein said input signals are forward link transmissions and said apparatus further includes a single high power amplifier for amplifying said aggregate signal, said high power amplifier located between said combiner and said length of cabling.

16. The apparatus as claimed in any one of claims 13, 14, or 15 wherein said phase discriminator is a modified Wilkinson combiner and both said modulators and said demodulators utilize an orthogonal methodology.

17. The apparatus as claimed in claim 16 wherein said orthogonal methodology includes Walsh codes.

18. The apparatus as claimed in any one of claims 13, 14, or 15 wherein said phase discriminator is a 90° hybrid and both said modulators and said demodulators utilize an orthogonal methodology.

19. The apparatus as claimed in claim 18 wherein said orthogonal methodology includes Walsh codes.

20. The apparatus as claimed in any one of claims 13, 14, or 15 wherein said phase discriminator is a modified Wilkinson combiner and both said modulators and said demodulators utilize a quasi-orthogonal methodology.

21. The apparatus as claimed in any one of claims 13, 14, or 15 wherein said phase discriminator is a 90° hybrid and both said modulators and said demodulators utilize a quasi-orthogonal methodology.

22. A method for processing N number of input signals having a common frequency and chin rate, said method comprising:
    obtaining N number of input signals having a common frequency;

phase-shifting each one of said input signals by a respective phase shift sequence via a modulation scheme;

combining said phase-shifted signals to form an aggregate signal;

transmitting said aggregate signal across a length of cabling;

separating said aggregate signal through a demux element such that said aggregate signal is separated into constituent components each corresponding to each one of said input signals; and demodulating each of said constituent components into N number of recovered signals each corresponding substantially identically to one of said N number of input signals;

wherein said demux element includes N−1 splitters, a delay element associated with each splitter, each delay element having one or more switches for switching in a delay dependent on said chip rate, and a phase discriminator associated with each delay element.

23. The method as claimed in claim 22, further including between said obtaining step and said phase-shifting step, amplifying said input signal via a plurality of amplifiers.

24. The method as claimed in claim 23 wherein said input signals are forward link transmissions and said plurality of amplifiers are high power amplifiers.

25. The method as claimed in claim 23 wherein said input signals are reverse link transmissions and said plurality of amplifiers are low power preamplifiers.

26. The method as claimed in claim 23 wherein said input signals are forward link transmissions and said method further includes between said combining step and said transmitting step, amplifying said aggregate signal via a single high power amplifier.

27. The method as claimed in any one of claims 24, 25, or 26 wherein said phase discriminator is a modified Wilkinson combiner and said modulation scheme utilizes an orthogonal methodology.

28. The method as claimed in claim 27 wherein said orthogonal methodology includes Walsh codes.

29. The method as claimed in any one of claims 24, 25, or 26 wherein said phase discriminator is a 90° hybrid and said modulation scheme utilizes an orthogonal methodology.

30. The method as claimed in claim 29 wherein said orthogonal methodology includes Walsh codes.

31. The method as claimed in any one of claims 24, 25, or 26 wherein said phase discriminator is a modified Wilkinson combiner and said modulation scheme utilizes a quasi-orthogonal methodology.

32. The method as claimed in any one of claims 24, 25, or 26 wherein said phase discriminator is a 90° hybrid and said modulation scheme utilizes a quasi-orthogonal methodology.

33. An apparatus for processing N modulated input signals having a common frequency, said apparatus comprising:

a demux element for demultiplexing an amplified aggregate signal consisting of modulated forms of said input signals to output N signals, N demodulators, each demodulator for demodulating a corresponding one of said N signals to produce N output signals, each corresponding to one modulated input signal, said demux element including cascading stages, with each stage comprising:

a splitter for splitting said aggregate signal into two signals;

a delay element having one or more switches, said delay element adding a differential amount of delay between said two signals for filtering outputs of said splitter into odd and even groups of frequencies said amount of differential delay dependent on the modulation rate used to modulate said N modulated input signals; and a phase discriminator for grouping said odd and even frequencies.

34. The apparatus as claimed in claim 33 wherein said phase discriminator is a modified Wilkinson combiner and said demodulator utilizes an orthogonal methodology.

35. The apparatus as claimed in claim 34 wherein said splitter and said switches are arranged to form a comb filter.

36. The apparatus as claimed in claim 33 wherein said phase discriminator is a 90° hybrid and said demodulator utilizes an orthogonal methodology.

37. The apparatus as claimed in claim 36 wherein said splitter and said switches are arranged to form a comb filter.

38. The apparatus as claimed in claim 33 wherein said phase discriminator is a modified Wilkinson combiner and said demodulator utilizes a quasi-orthogonal methodology.

39. The apparatus as claimed in claim 33 wherein said phase discriminator is a 90° hybrid and said demodulator utilizes a quasi-orthogonal methodology.

* * * * *